(12) United States Patent
Unno et al.

(10) Patent No.: US 8,301,969 B2
(45) Date of Patent: Oct. 30, 2012

(54) CONTROL METHOD OF INFORMATION PROCESSING DEVICE AND INFORMATION PROCESSING DEVICE

(75) Inventors: Hideyuki Unno, Kawasaki (JP); Masaki Ukai, Kawasaki (JP); Naozumi Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 940 days.

(21) Appl. No.: 12/198,577

(22) Filed: Aug. 26, 2008

(65) Prior Publication Data
US 2008/0320360 A1  Dec. 25, 2008

Related U.S. Application Data

(63) Continuation of application No. PCT/JP2006/303653, filed on Feb. 27, 2006.

(51) Int. Cl.
*H03M 13/00* (2006.01)
(52) U.S. Cl. ...................................................... 714/758
(58) Field of Classification Search .................. 714/746, 714/752–758, 781–804
See application file for complete search history.

(56) References Cited

U.S. PATENT DOCUMENTS

| | | | |
|---|---|---|---|
| 5,103,167 A | 4/1992 | Okano et al. | |
| 6,243,361 B1 * | 6/2001 | McMillen et al. | 370/254 |
| 6,823,484 B2 * | 11/2004 | Kikuchi et al. | 714/701 |
| 2002/0035714 A1 * | 3/2002 | Kikuchi et al. | 714/755 |
| 2002/0046382 A1 * | 4/2002 | Yang | 714/758 |
| 2003/0066008 A1 * | 4/2003 | Kikuchi et al. | 714/752 |
| 2004/0001269 A1 * | 1/2004 | Itou et al. | 360/53 |

FOREIGN PATENT DOCUMENTS

| | | |
|---|---|---|
| JP | 3-89182 | 4/1991 |
| JP | 8-154084 | 6/1996 |
| JP | 8-195736 | 7/1996 |
| JP | 2002-304306 | 10/2002 |

OTHER PUBLICATIONS

Japanese Office Action issued Mar. 8, 2011 in corresponding Japanese Patent Application 2008-501590.
European Search Report dated May 7, 2010 and issued in corresponding European Patent Application 06714790.0.

* cited by examiner

*Primary Examiner* — Nadeem Iqbal
(74) *Attorney, Agent, or Firm* — Fujitsu Patent Center

(57) ABSTRACT

A transmitting side device (10) and a receiving side device (20) are connected to each other via a bus (30) comprising TAG bits (31), data bits (32) and error detection/correction ECC bits (33). The transmitting side device (10) uses a redundant bit inversion circuit (14) to invert different bits of the ECC bits (33) corresponding to trigger signals (41 & 42). In the receiving side device (20), a determination circuit (24), which has received an error report signal (26) from an error detection/correction circuit (22), determines, from the position of an error bit in the ECC bits (33), which one of the trigger signals (41 & 42) has been transmitted from the transmitting side device (10).

8 Claims, 10 Drawing Sheets

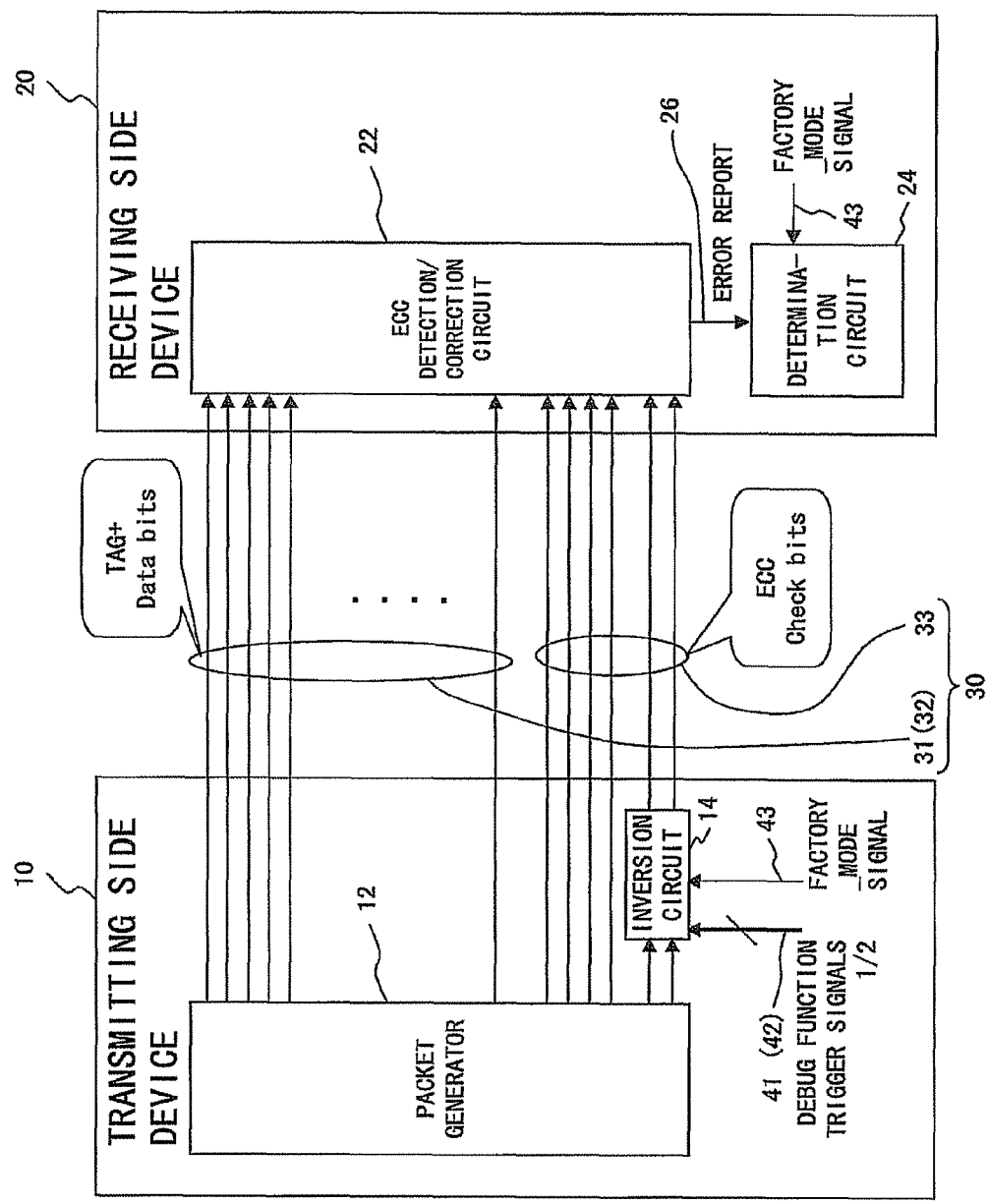
F I G. 1

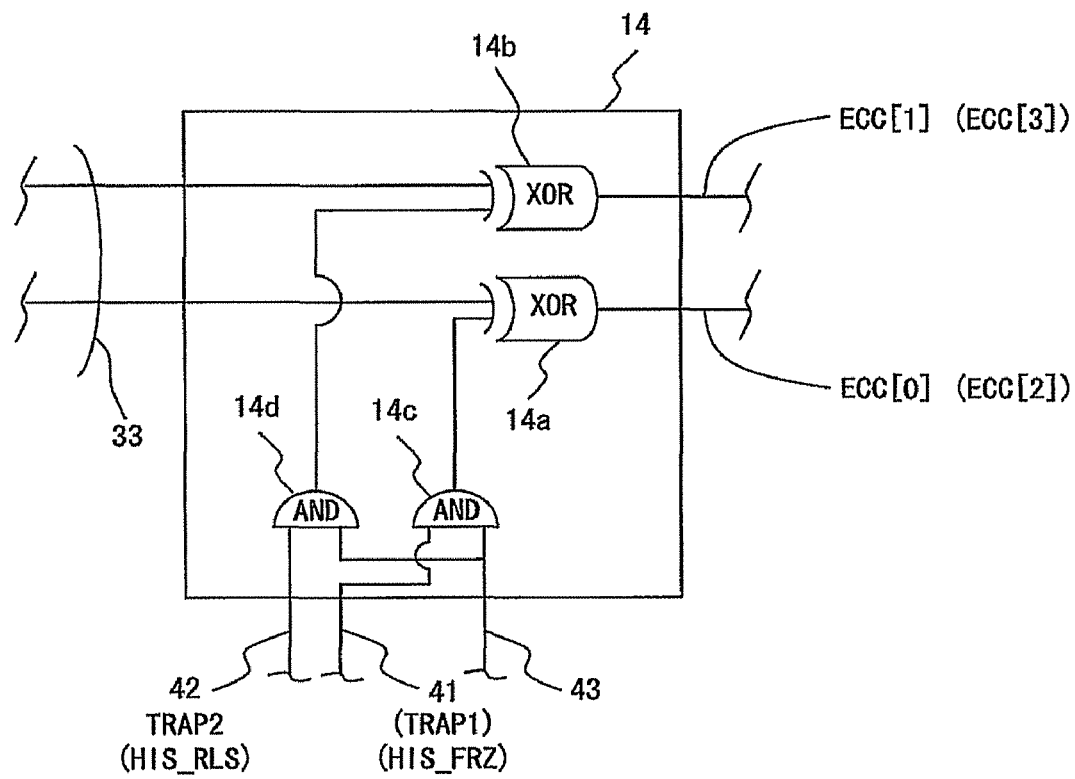
F I G. 2

| | | |
|---|---|---|
| TRAP1 | SCREQ_BUS_ECC[0] | 41 |
| TRAP2 | SCREQ_BUS_ECC[1] | 42 |
| HIS_FRZ | SCODR_BUS_ECC[0] | 41 |
| HIS_RLS | SCODR_BUS_ECC[1] | 42 |
| START | SCODR_BUS_ECC[2] | 41 |
| STOP | SCODR_BUS_ECC[3] | 42 |

F I G. 4

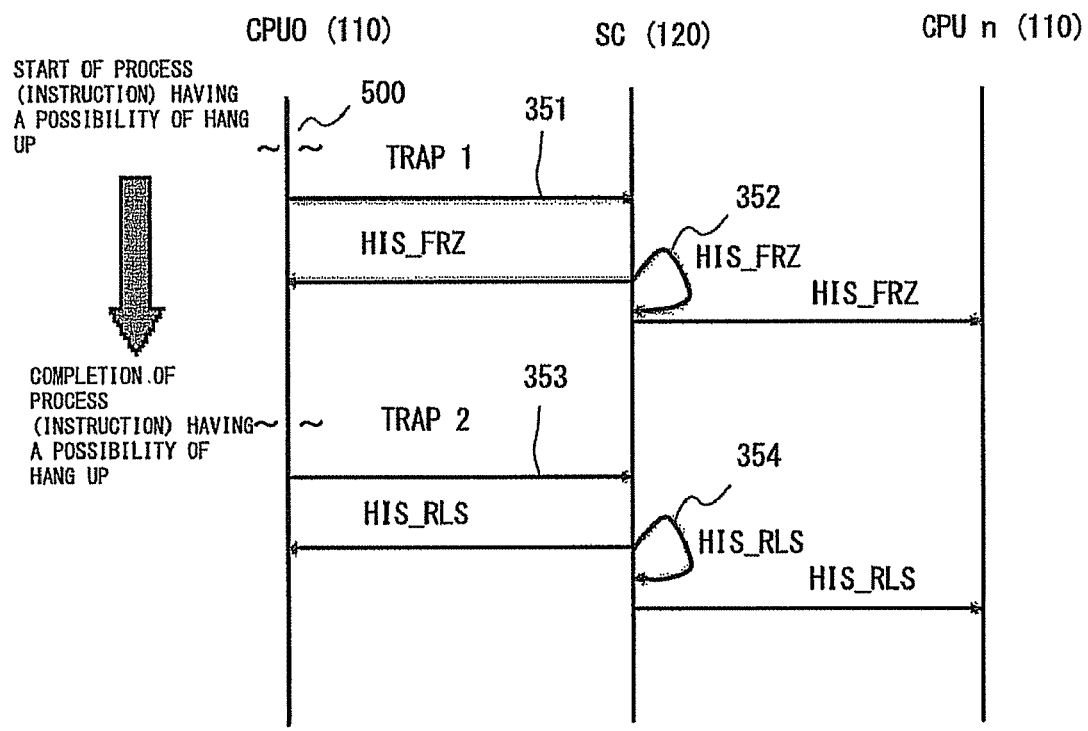
F I G. 9

US 8,301,969 B2

CONTROL METHOD OF INFORMATION PROCESSING DEVICE AND INFORMATION PROCESSING DEVICE

CROSS-REFERENCE TO THE RELATED APPLICATION

This application is a continuation application of an international patent application No. PCT/JP2006/303653, filed on Feb. 27, 2006.

BACKGROUND OF THE INVENTION

1. Field of the Invention

The present invention relates to information processing technology, for example, a technology effective when applied to debug, performance measurement and the like in the development process, maintenance process and the like of an information processing device.

2. Description of the Related Arts

For example, in the development and maintenance processes of an information processing device, it is necessary to debug in order to trace the cause of an abnormal operation or a failure, to improve performance or the like.

Therefore, history memory for recording an operation history can be provided in a plurality of devices constituting a system, an operation history during a specific period before and after a failure occurs can be recorded by instructing each device to simultaneously start and stop recording an operation history from outside. Then the history can be read out to the outside and can be used to analyze a cause.

Performance can be also measured by recording the amount of transferred data and the times of specific executed instructions in a specific period in each device, in history memory as an operation history.

In this way, as a method for giving instructions on various operation timings and the like to each device from outside, traditionally a dedicated signal wire is installed.

It is because the debug function of hardware, such as history memory and the like can be used without disturbing an operation at the time of normal running and accurate failure analysis reflecting an actual operational state is possible.

However, since today the integration density of semi-conductor devices constituting a device is improved, and the mounting cost of signal wires between devices becomes relatively high and is increasing, a cost for installing a dedicated debug signal wire, which is not used at all in a normal operation, between devices cannot be neglected.

A control command to control a debug function can be also added instead of installing the dedicated debug signal wire as this countermeasure. However, in this case, the normal running operation of the system is disturbed by the execution of this control command and it becomes disadvantageous when analyzing a system behavior highly depending on an operational timing.

SUMMARY OF THE INVENTION

It is an object of the present invention to provide a technology for capable of realizing exact debug using the debug function of hardware without increasing costs.

It is another object of the present invention to provide a technology capable of realizing the debug of system behavior highly depending on an operational timing without requiring hardware, such as an extra dedicated signal wire and the like.

The first aspect of the present invention provides the control method of an information processing device comprising connecting a first device and a second device via an information transmission path protected by adding a redundant bit for error detection/correction (a first step) and transmitting information from the first device to the second device by intentionally operating the redundant bit.

The second aspect of the present invention provides the control method of an information processing device for operating the redundant bits after setting a specific operation mode different from one at the time of normal running to the first and second devices in the second step of the control method of an information processing device specified in the first aspect.

The third aspect of the present invention provides the control method of an information processing device in which the first device on the transmitting side operates the redundant bit in a range where the error correction is possible and the second device at the receiving side recognizes the error detection as the information transmission and corrects the error when the error is detected in the redundant bit in the second step of the control method of an information processing device specified in the first aspect.

The fourth aspect of the present invention provides the control method of an information processing device for causing a correctable false error by assigning different information to each of the plurality of redundant bits and realizing the information transmission on the basis of the position recognition result of an error bit in the redundant bit in the second step of the control method of an information processing device specified in the first aspect.

The fifth aspect of the present invention provides the control method of an information processing device for transmitting information for debug or performance measurement in the second step of the control method of an information processing device specified in the first aspect.

The sixth aspect of the present invention provides an information processing device in which the first and second devices are connected to each other via an information transmission path protected by adding a redundant bit for error detection/correction, comprising information transmission unit for transmitting specific information from the first device to the second device by intentionally operating the redundant bits.

The seventh aspect of the present invention provides an information processing device in which the information transmission unit causes a correctable false error by assigning different specific information to each of the plurality of redundant bits in the first or second device on the transmitting side and realizes the specific information on the basis of a position recognition result of an error bit in the redundant bits in the second or first device at the receiving side in the information processing device specified in the sixth aspect.

The eighth aspect of the present invention provides an information processing device in which the information transmission unit comprises a function to recognize a specific operation mode different from the one at the time of a normal running in the information processing device and transmits the specific information by operating the redundant bits in the specific operation mode in the information processing device specified in the sixth aspect.

The ninth aspect of the present invention provides an information processing device in which the information transmission unit comprises a redundant bit operation unit disposed in the first and/or second device on the transmitting side, for operating the redundant bits according to the specific information and a determination unit disposed in the second and/or first device on the receiving side, for receiving the specific information on the basis of a report of the error detection, obtained by referring to the redundant bits in the information processing device specified in the sixth aspect.

The tenth aspect of the present invention provides an information processing device for operating the redundant bit in a range in which the error correction is possible on the transmitting side of the information transmission unit and for recognizing the error detection as the specific information and performing the error correction when detecting the error in the redundant bit on the receiving side of the information transmission unit in the information processing device specified in the sixth aspect.

The eleventh aspect of the present invention provides an information processing device in which the specific information is a command for debug or performance measurement in the information processing device specified in the sixth aspect.

Generally, in an information processing device, the reliability of transmitting data of an information transmission path, such as a bus for connecting a plurality of devices and the like, by providing a redundant bit, such as ECC and the like.

The present invention realizes the transmission of information between devices by using the signal wire for a redundant bit, such as this ECC and the like. Since an ordinary bus is provided with this signal wire for a redundant bit, there is no need to install a dedicated debug signal wire, thereby reducing the manufacturing cost of a debug-related function.

For example, on the transmitting side of data, a correctable false error is caused by operating a redundant bit for this ECC (error correction code). On the receiving side of data, the correctable error is detected in this redundant bit and receiving information is recognized on the basis of the position information of an error bit.

Since a correctable error is simply caused by operating a redundant bit, essential transmitting data, a transmitting timing and the like are not affected at all. Specifically, a debug function provided in each device can be controlled by operating redundant bits without disturbing the normal operating state of the system.

Especially, even in the analysis of a system behavior highly depending on timing, accurate analysis is possible.

Since the recent reliability of a bus is high and it can be considered that in a short period of debug and the like, a data error hardly occur actually, information transmission is possible by operating a redundant bit, such as ECC and the like.

Alternatively, a specific operation mode indicating that it is during debug can be set and the above-described information transmission using the redundant bits can be also performed using this operation mode and the operation of the redundant bits together.

BRIEF DESCRIPTION OF DRAWINGS

FIG. 1 is a block diagram showing the configuration example of the information processing device for implementing the control method of the information processing device in one preferred embodiment of the present invention.

FIG. 2 is a conceptual drawing exemplifying the information processing system by taking a part of the information processing device in one preferred embodiment of the present invention.

FIG. 4 shows an example of the assignment of ECC bits and transmitting signals in the information processing system for implementing the control method of the information processing device in one preferred embodiment of the present invention.

FIG. 9 is another sequence chart showing one example of the operation of the information processing system for implementing the control method of the information processing device in one preferred embodiment of the present invention.

DESCRIPTION OF THE PREFERRED EMBODIMENTS

Figure 3:
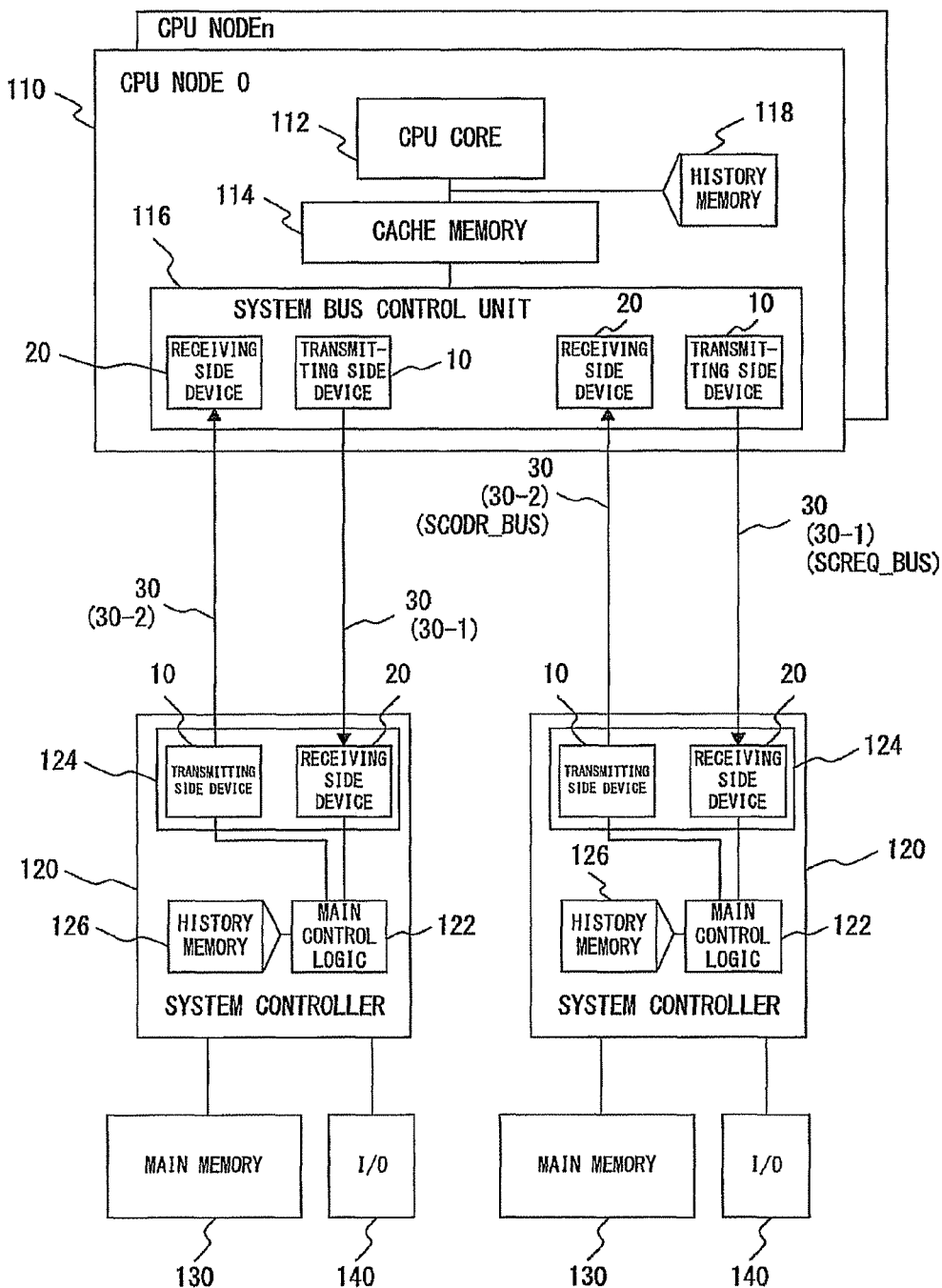
FIG. 3 is a conceptual drawing showing one configuration example of the information processing system for implementing the control method of the information processing device in one preferred embodiment of the present invention.

The preferred embodiments of the present invention are described in detail below with reference to the drawings.

FIG. 1 is a block diagram showing the configuration example of the information processing device for implementing the control method of the information processing device in one preferred embodiment of the present invention. FIG. 2 is a conceptual drawing exemplifying the information processing system by taking a part of the information processing device in one preferred embodiment of the present invention.

As exemplified in FIG. 1, the information processing device in this preferred embodiment comprises a transmitting side device 10 and a receiving side device 20.

Between the transmitting side device 10 and the receiving side device 20, a bus 30 is provided. Data is transferred from the transmitting side device 10 to the receiving side device 20 using this bus 30.

The bus 30 comprises TAG bits 31, data bits 32 and redundant ECC bits 33 for protecting these from an error.

For example, when the respective number of the TAG bits 31 and the data bits 32 are 3 and 24, respectively, 7 bits are provided as the ECC bits 33.

When the respective number of the TAG bits 31 and the data bits 32 are 3 and 40, respectively, 7 bits are provided as the ECC bits 33.

In either of these cases, the error position of a one-bit error of the bus 30 (in this case, 34 or 50 bits) can be specified. Therefore, the error can be corrected.

A two-bit error can be detected but cannot be corrected.

The transmitting side device 10 comprises a packet generator 12. This packet generator 12 has a function to generate a packet composed of a prescribed pit pattern corresponding to the data bit 32 and a bit corresponding to the TAG bit 31. The transmitting side device 10 further has a function to calculate and set the value of the ECC bit 33 for protecting packet data composed of this TAG bit 31 and the data bit 32.

The receiving side device 20 comprises an error detection/correction circuit 22. This error detection/correction circuit 22 has a function to detect whether there is an error in each bit of the bus 30, using the TAG bit 31, the data bit 32 and a redundant ECC bit 33 and a function to correct the error.

Specifically, when each of the TAG bit 31, data bit 32 and ECC bit 33 of the bus 30 has the above-described bit configuration and an error (bit inversion) occurs in one bit of these bits, the position of the error bit can be specified and also the error can be corrected.

In the case of this preferred embodiment, information transmission can be realized between the transmitting side device 10 and the receiving side device 20 by intentionally inverting one bit of the redundant ECC bits using the error detection and correction functions of this bus 30.

Specifically, in the case of this preferred embodiment, the transmitting side device 10 comprises a redundant bit inversion circuit 14 for transmitting information. The receiving side device 20 comprises a determination circuit 24 for receiving (recognizing) information.

In the case of this preferred embodiment, this redundant bit inversion circuit 14 has, for example, a function to operate each of two bits of the ECC bits 33.

Specifically, in the case of this preferred embodiment, two types of signals (in this case, trigger signals 41 and 42) are transmitted from the transmitting side device 10 to the receiving side device 20 using two bits of the ECC bits 32.

In this case, a Factor_mode signal 43 for identifying the error of this ECC bit 33 as a false error for information transmission is inputted to the redundant bit inversion circuit 14 of the transmitting side device 10 and the determination circuit 24 of the receiving side device 20.

This Factor_mode signal 43 is not always necessary. In other words, since the reliability of the recent bus 30 is high, during a fairly short period, such as at the time of debug and the like, it can be considered that there is hardly any error in the bus 30. Therefore, information transmission using the ECC bit 33 is possible by the determination on only whether there is a bit error in the ECC bit 33.

In order to make information transmission using the ECC bit 33 surer, this preferred embodiment is provided with the Factor_mode signal 43.

FIG. 2 shows a configuration example of this redundant bit inversion circuit 14. The redundant bit inversion circuit 14 comprises a plurality of XOR circuits 14a and 14b and a plurality of corresponding AND circuits 14c and 14d, respectively.

In this case, the XOR circuit 14a is disposed in ECC[0] of the bit wires ECC[0]~[6] of the ECC bit 33.

Then, when the input from the AND circuit 14c is true ("1"), by calculating the XOR of input from a corresponding AND circuit 14c and the logic state of ECC[0] the logic state of ECC[0] is inverted from "0" to "1" or "1" to "0".

Similarly, the XOR circuit 14b is disposed in a bit wire ECC[1] and when input from a corresponding AND circuit 14d is true ("1"), the logic state of ECC[1] is inverted.

The AND circuit 14c inputs the AND of the Factor_mode signal 43 and the trigger signal 41 being information to be transmitted to the XOR circuit 14a.

Similarly, the AND circuit 14d inputs the AND of the Factor_mode signal 43 and the trigger signal 42 to the XOR circuit 14b.

The receiving side device 20 is provided with the determination circuit 24 in order to recognize the information transmitted to the ECC bit 33 via the redundant bit inversion circuit 14.

This determination circuit 24 recognizes the information transmitted from the redundant bit inversion circuit 14 (transmitting side device 10) on the basis of an error report signal 26 inputted from the error detection/correction circuit 22.

Specifically, it is determined whether each of trigger signals 41 and 42 is transmitted during a period where the Factor_mode signal 43 is true ("1"), on the basis of the detection position of an error bit in the ECC bit 33 and the Factor_mode signal 43 included in the error report signal 26.

However, as described above, the Factor_mode signal 43 is not indispensable. Since there is hardly any error in the bus 30 in a fairly short period when the reliability of the bus 30 is high, trigger signals 41 and 42 can be received only by monitoring whether there is an error in the specific bit of the ECC bit 33.

On example of the function of this preferred embodiment shown in FIG. 1 is described below.

In the transmitting side device 10, information to be transmitted is transferred to the receiving side device 20 to the error detection/correction circuit 22 in the form of packet using the TAG bit 31 and the data bit 32. At this moment, the bit of the ECC bit 33 for error detection/correction is appropriately set according to the respective bit state of the TAG bit 31 and the data bit 32.

In the receiving side device 20 receiving this packet the reliability of the bus 30 (packet) is secured by detecting and correcting an error in the error detection/correction circuit 22.

In this case, if transmitting information using the ECC bit 33, firstly, the Factory_mode signal 43 of true ("1") is inputted to each of the redundant bit inversion circuit 14 of the transmitting side device 10 and the determination circuit 24 of the receiving side device 20.

Then, in the transmitting side device 10, the corresponding bit of the ECC bit 33 is inverted by making the trigger signal 41 or 42 "1" as requested and the trigger signal 41 or 42 is transmitted to the receiving side device 20 as a correctable false error.

In the receiving side device 20, the correctable false error generated by the redundant bit inversion circuit 14 is detected by the error detection/correction circuit 22 and also the error bit position of the ECC bit 33 is inputted to the determination circuit 24 as an error report signal 26. Upon receipt of this error report signal 26, the determination circuit 24 recognizes the reception of the trigger signal 41 or 42 from the reported bit position in the ECC bit 33 and transfers it to another circuit, which is not shown in FIG. 1.

Thus, in the case of this preferred embodiment, by using the ECC bit 33 provided to protect transmission information, such as the TAG bit 31, the data bit 32 and the like in the bus 30, the information of the trigger signal 41 or 42 can be transmitted from the transmitting side device 10 to the receiving side device 20 without providing a dedicated signal wire or the like.

Since the detecting and correcting operation of a correctable false error generated by the redundant bit inversion circuit 14, of the ECC bit 33 in the error detection/correction circuit 22 is performed in the same process as normal error detection/correction, the data transmitting state of the TAG bit 31 and the data bit 32 in the bus 30 is not affected at all.

Therefore, for example, even in the process highly depending on the transmitting timing of the TAG bit 31 and the data bit 32, the trigger signal 41 or 42 can be transmitted from the transmitting side device 10 to the receiving side device 20 without disturbing the TAG bit 31 and the data bit 32.

A case where the information transmitting technology of this preferred embodiment using such an ECC bit 33 is applied to the debug of an information processing system is described in more detail below.

FIG. 3 is a conceptual drawing showing one configuration example of an information processing system for implementing the control method of the information processing device in this preferred embodiment.

The information processing system 100 exemplified in FIG. 3 comprises a plurality of CPU nodes 110, a plurality of system controller 120, main memory 130 and input/output equipment 140.

A bus 30 (SCREQ_BUS30-1) for transferring information from the CPU node 110 to the system controller 120 and a bus 30 (SCODR_BUS30-2) for transferring information from the system controller 120 to the CPU node 110 are provided between each CPU node 110 and each system controller 120.

Each of the CPU 110 and the system controller 120 is provided with the transmitting side device 10 and the receiving side device 20 in relation to each of the SCREQ_BUS30-1 and SCODR_BUS30-2 whose information transfer directions are opposite.

Each of the transmitting side device 10, the receiving side device 20 and the bus 30 has the same configuration as each of those, respectively, exemplified in FIG. 1.

Each CPU node 110 comprises one or a plurality of CPU cores 112, cash memory 114, a system bus control unit 116 and history memory 118.

The CPU core 112 comprises register memory, a calculator and a controller, and calculates and controls.

The cash memory 114 temporarily stores information to be transmitted/received between the CPU core 112 and the system bus control unit 116.

The system bus control unit 116 comprises the transmitting side device 10 and the receiving side device 20, as described above and transmits/receives information between the main memory 130 and the input/output equipment 140 via the SCREQ_BUS30-1, SCODR_BUS30-2 and the system controller 120.

The history memory 118 stores the operational history of each unit in the CPU node 110 endlessly. Specifically, the history memory 118 stores the operational history of each unit in the CPU node 110 for a time corresponding to the storage capacity of the history memory 118.

Each system controller 120 comprises a system control logic 122, a system bus control unit 124 and history memory 126.

The system control logic 122 controls the entire system controller 120 and processes access requests from the CPU node 110 to the main memory 130 and the input/output equipment 140.

The system bus control unit 124 comprises the transmitting side device 10 and the receiving side device 20 and controls the transmission/reception of information between it and the CPU node 110 via the SCREQ_BUS3-1 and SCODR_BUS30-2.

FIG. 4 is a conceptual drawing showing the assignment example of the trigger signals 41 and 42 transmitted by the operation of the ECC bit 33 in this information processing system 100.

In the SCREQ_BUS30-1 for transferring information from the CPU node 110 to the system controller 120, TRAP1 and TRAP2 are assigned as the trigger signals 41 and 42, respectively.

In the SCODR_BUS30-2 for transferring information from the system controller 120 to the CPU node 110, HIS_FRZ and START, are assigned as the trigger signal 41 and HIUS_RLS and STOP 42 are assigned as the trigger signal 42.

Figure 5:
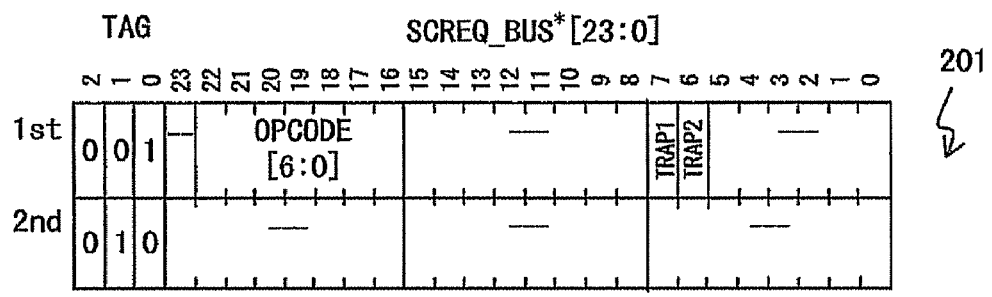
FIG. 5 is a conceptual drawing showing one example of a packet for debug request in the information processing system for implementing the control method of the information processing device in one preferred embodiment of the present invention.
Figure 6:
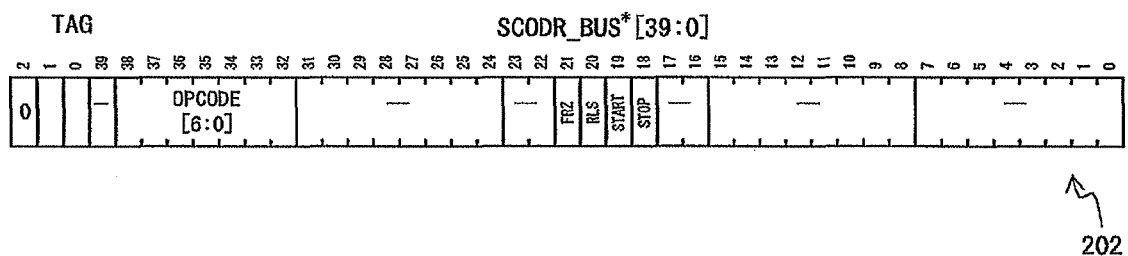
FIG. 6 is a conceptual drawing showing one example of a packet for debug order in the information processing system for implementing the control method of the information processing device in one preferred embodiment of the present invention.

In the information processing system 100 in this preferred embodiment, at the time of normal running, the debug packet as exemplified in FIGS. 5 and 6 can be used to control the debug function.

Only when the Factory_mode signal 43 is valid ("1"), by the bit inversion of the ECC bit 33, communications are conducted between the CPU node 110 and the system controller 120. The number of communication event simultaneously caused using the ECC bit 33 is one. This is because a correctable false error (CE) is used.

As described above, each CPU node 110 is connected to one or more system controllers 120 by the ECC-protected bus 30.

In this preferred embodiment, in the bus 30 (SCREQ_BUS30-1) for the transfer direction from the CPU node 110 to the system controller 120, the TAG bit 31, the data bit 32 and ECC bit 33 are composed of 3 bits, 24 bits and 7 bits, respectively.

In the bus 30 (SCODR_BUS30-2) for the transfer direction from the system controller 120 to the CPU node 110, the TAG bit 31, the data bit 32 and ECC bit 33 are composed of 3 bits, 40 bits and 7 bits, respectively.

Each of the SCREQ_BUS30-1 and SCODR_BUS30-2 is protected by the ECC bit 33 and the error position of an arbitrary one-bit error can be specified. Therefore, the error can be corrected.

A two-bit error can be detected but cannot be corrected.

This preferred embodiment has the debug request packet 201 exemplified in FIG. 5 and the debug order packet 202 exemplified in FIG. 6 as the activation signal of the debug function in a normal mode (at the time of normal running).

The debug request packet 201 exemplified in FIG. 5 is used to activate a function to debug from the CPU node 110 to the system controller 120.

In the SCREQ_BUS[23:0] with 24-bit width of the SCREQ_BUS 30-1, the debug request instruction code with 7-bit width is set in the SCREQ_BUS[22]~[16] and the activation signals of TRAP2 and TRAP1 are assigned to the SCREQ_BUS[6] and [7], respectively.

The debug order packet 202 shown in FIG. 6 is used to activate a function to debug from the system controller 120 to the CPU node 110.

In the SCORD_BUS[39:0] with 40-bit width of 0~39 of the SCORD_BUS 30-2, the debug order instruction code with 7-bit width is set in the SCREQ_BUS[38]~[32] and the activation signals of HIS_FRZ, HIS_RLS, START and STOP are assigned to the SCREQ_BUS[21], [20], [19] and [18], respectively.

In this case, the HIS_FRZ is the freeze instruction of history data in hardware, such as the history memory 118 and 126 and the like. This freeze instruction stops writing into the history memory 118 and 126 and history data up to the time point is overwritten and stored without any loss.

The HIS_RLS is a release instruction to the history memory 118 and 126 and the like. This release instruction re-starts the writing of history data into the history memory 118 and 126.

The START is a control signal for performance measurement and instructs debug hardware which is not shown in FIG. 3 to start measuring the execution times of, for example, a specific instruction and the like.

The STOP is similarly a control signal for performance measurement and instructs debug hardware which is not shown in FIG. 3 to stop the measurement.

Either of them is a signal for controlling a debug device for examination provided in the hardware of the CPU 110 and the system controller 120.

As described above, when using the dedicated debug request packet 201, debug order packet 202 and the like in order to transmit these signals, there is a possibility that the packets may disturb the operation of the information processing system 100.

This becomes a problem when examining the behaviors of the information processing system 100 highly depending on timing.

Therefore, in this preferred embodiment, as described above, debug signals, such as TRAP1, TRAP2, HIS_FRZ, HIS_RLS, START, STOP and the like are realized by operating the existing ECC bit 33.

Specifically, this preferred embodiment is provided with for example, a dedicated examination mode (Factory_mode signal 43) in the development process and maintenance of the information processing system 100 at a factory and the ECC bit 33 is used to transmit/receive a debug signal only at the time of this mode.

Thus, trigger signals with a debug function can be transmitted/received between the CPU node 110 and the system controller 120 without interfering with the packet transfer of a normal running system using the data bit 32 in the SCREQ_BUS30-1 and SCODR_BUS30-2.

A signal transferred using the ECC bit 33 and a used check bit at the setting time of the Factory_mode signal 43 are as exemplified in FIG. 4.

When transmitting the above-described trigger signal, the transfer source CPU node 110 or system controller 120 inverts the bit of the ECC bit 33 in the redundant bit inversion circuit 14 of the transmitting side device 10.

In other words, the generation of a trigger is reported by intentionally generating a correctable error on the bus 30.

Since the ECC bit 33 on the bus 30 is valid regardless of a transfer state (including the idle time), a trigger signal can be transferred in an arbitrary timing. However, theoretically two triggers cannot be simultaneously transferred.

In the receiving side device 20 of the receiving side system controller 120 or CPU node 110, the error detection/correction circuit 22 detects a correctable error and if an error bit position is a trigger transfer bit, the determination circuit 24 recognizes the reception of a trigger signal. In this case, the report of the detection of a correctable error to the higher-order system control logic 22 and the like must be suppressed.

In the ECC bit 33, the error of a bit not used to transfer a trigger signal is normally corrected and the error is reported to the system control logic 22 and the like.

Figure 7:
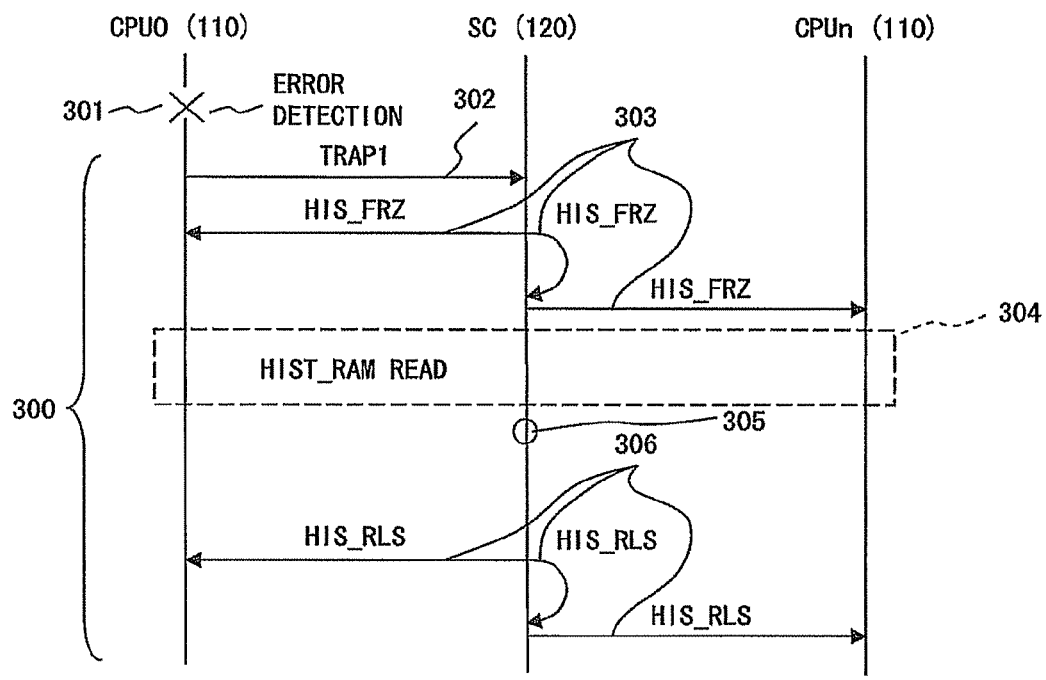
FIG. 7 is a sequence chart showing one example of the operation of the information processing system for implementing the control method of the information processing device in one preferred embodiment of the present invention.

One example of the process using a trigger signal for debug transmitted by the operation of the ECC bit 33 is described with reference to the sequence chart shown in FIG. 7.

Firstly, a history information reading process 300 is described. When some failure occurs in the information processing system 100 due to an internal factor, the operational history at the time of its occurrence and immediately before and after it of each piece of hardware, such as the CPU node 110, sometimes it is desired to read the system controller 120 and the like from the history memory 118 and 126 and the like and to analyze its cause.

However, as described above, since the history memory 118 and 126 records history information endlessly while overwriting it on the limited storage area, writing (overwriting) must be stopped from time to time.

In this preferred embodiment, such control of the history memory 118 and 126 is realized as follows.

When in the true state of the Factory_mode signal 43, an error id detected, for example, in one CPU node 110 (CPU0) (step 301), the CPU node 110 notifies the system controller 120 of TRAP1 by inverting the ECC bit 33 (ECC[0]) of the SCREQ_BUS30-1 (step 302).

When the determination circuit 24 of the receiving side device 20 recognizes this TRAP1, the system controller 120 notifies all the CPU nodes 110 of HIS_FRZ by inverting the ECC [0] of the ECC bit 33 of the SCODR_BUS30-2 and also stops writing to the history memory 126 of its own device to prevent the history information in a prescribed past period from being overwritten and store it.

Similarly, when being notified of HIS_FRZ by the system controller 120 via the SCODR_BUS30-2, all the CPU nodes 110 stops updating the history memory 118 (step 303).

Then, the contents of the history memory 118 and 126 are read out to the outside in serial, for example, via a debug information reading pin, which is not shown in FIG. 3, provided in the CPU node 110 or the system controller 120 and are presented for analysis (step 304).

After the reading of this history information is completed, the release of the history is instructed to the system controller 120 via the dedicated debug pin, which is not shown in FIG. 3 (step 305).

The system controller 120 re-starts writing history information into the history memory 126 of its own device using this as a trigger and also notifies all the CPU nodes 120 of HIS_RLS via the ECC bit 33 of the SCODR_BUS30-2. Upon receipt of this notice, each CPU node 110 re-starts writing history information into the history memory 118.

Although in the example shown above in FIG. 7, the CPU issues HIS_FRZ using error detection as a trigger, the CPU can also issue HIS_FRZ after executing an arbitrary instruction as follows.

For example, a hang-up detection function can be also provided in the information processing system of this preferred embodiment as one error detection mechanism.

Figure 8:
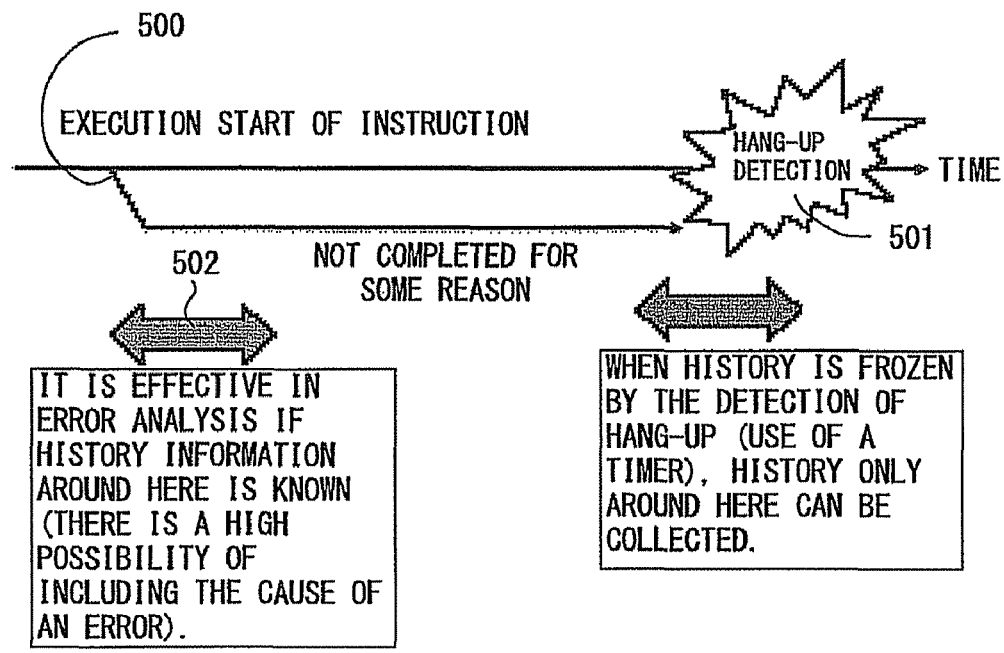
FIG. 8 is a conceptual drawing showing one example of the operation of the information processing system for implementing the control method of the information processing device in one preferred embodiment of the present invention.

However, as exemplified in FIG. 8, by freezing history at the time point of hang-up detection (time 501), only history in the vicinity of the hang-up detection point can be obtained and there is little possibility that this period may include desired information (cause of an error).

Therefore, it is controlled in such a way that HIS_FRZ can be temporarily issued at the start time of an instruction having a possibility of hang-up (for example, an instruction to make a response/process waiting state) (time 500) and after the instruction is correctly completed, HIS_RLS can be issued.

Thus, history information can be surely collected during a period having a high possibility of including the cause of an error immediately after the start of the instruction (time 502).

This process is described below as a history information reading process 350 with reference to FIG. 9.

A CPU0 issues TRAP1 to the system controller 120 (SC) at the time of issuing a specific instruction having a possibility of being hung up (time 500) (step 351). Upon receipt of this instruction, The SC issues HIS_FRZ to its own device and all the CPU nodes110 (step 352) to stop updating the history memory 118 and 126.

Thus, the history information during the above-described 502 can be stored in the history memory 118 and 126 and be collected.

Although in FIG. 7 above, HIS_RLS is simultaneously transmitted to all the CPU nodes 120 by giving an instruction to the system controller 120 from outside via a dedicated debug pin, which is not shown in FIG. 3, HIS_RLS can be also simultaneously transmitted from the CPU0 (CPU node110) to all the CPU nodes120 using TRAP2 as follows.

A case where the CPU node 110 issues HIS_RLS to the system controller 120 using TRAP2 is exemplified in the lower section of FIG. 9.

After starting executing a process (instruction) having a possibility of being hung up, such as system waiting accompanying cache mistake or the like (time 500), the CPU waits for a while (depending on the storage capacity of the history memory 118 and 126) and then issues TRAP1 (step 351).

Then, HIS_FRZ is issued (step 352) as described above.

If "the possibility of being hung up" leads to true hang-up, history is obtained a while later after the start of this process.

FIG. 9 shows a case where it does not leads to true hang-up. When true hang-up is not realized and the process is normally completed, the recording of history information in the history memory 118 and 126 must be restarted.

Therefore, the CPU0 issues TRAP2 to the SC (step 353) and the SC simultaneously transmits HIS_RLS to its own device and all the CPU nodes 120 using TRAP2 as a trigger (step 354). Thus, by synchronously controlling the update stoppage of the history memory 118 and 126 in each of the CPU nodes 110 or the system controllers 120 using HIS_FRZ, the history information of each system unit about the system error detected in step 301 can be exactly corrected.

Since only the ECC bit 33 essentially provided in each of the SCREQ_BUS30-1 and the SCODR_BUS30-2 is operated, data transfer in the TAG bit and the data bit 32 and the like is never disturbed.

Therefore, the history information collected from the history memory 118 and 126 and the like can reflect a system error as it is and perform accurate error analysis in a short period.

Furthermore, since various types of debug signals as shown in FIG. 4 are transmitted by the operation of the ECC bit 33 essentially provided in each of the SCREQ_BUS30-1 and the SCODR_BUS30-2, there is no need to install an extra dedicated debug signal wire in order to transmit these debug signals, thereby reducing the manufacturing cost of the information processing system 100.

Figure 10:
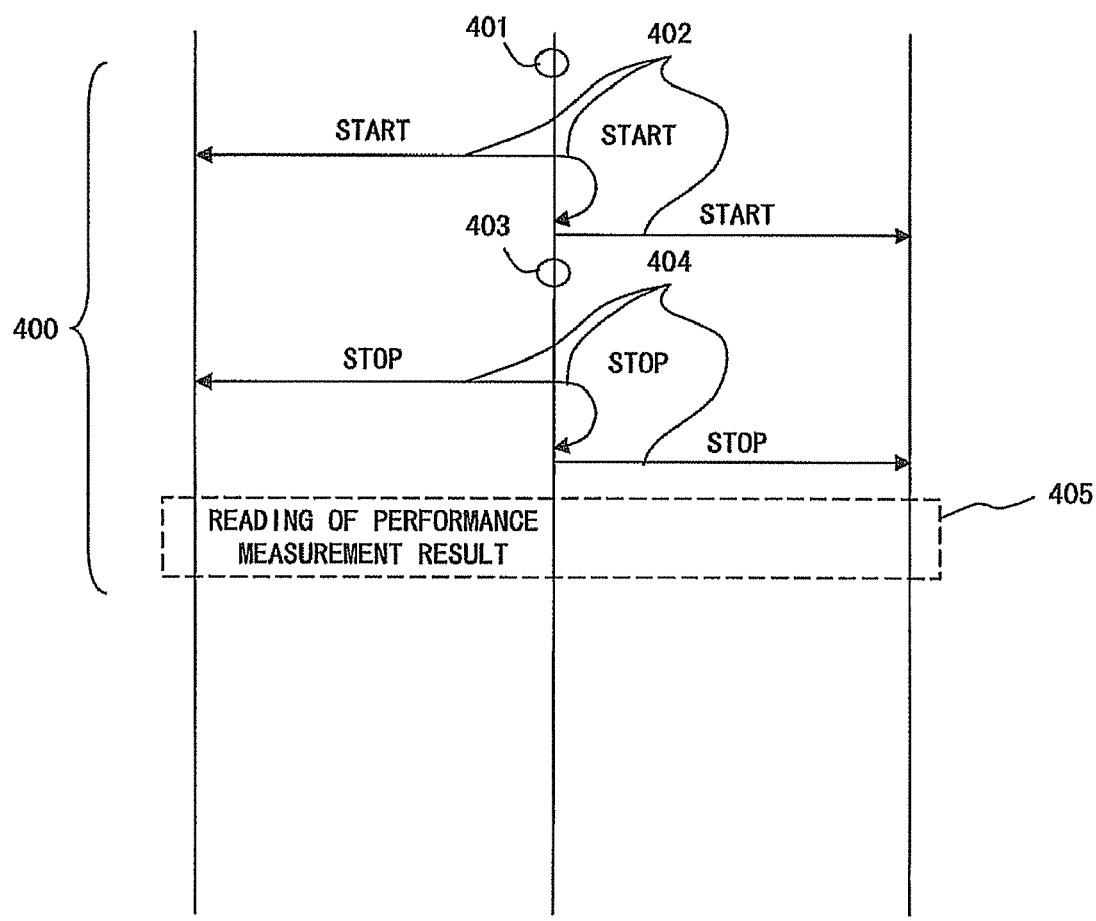
FIG. 10 is a sequence chart showing one example of the operation of the information processing system for implementing the control method of the information processing device in one preferred embodiment of the present invention.

Next, a performance measurement process 400 is described with reference to FIG. 10.

Sometimes it is desired to measure the execution times of a specific instruction and the like during the operation of the information processing system 100 in order to optimize the hardware and software of the information processing system 100 and so on.

In this preferred embodiment, this performance measurement process 400 is performed as follows.

Firstly, the system controller 120 is instructed to start the performance measurement process using a dedicated debug pin, which is not shown in FIG. 3, and the like (step 401).

Upon receipt of this instruction, the system controller 120 notifies all the CPU nodes 110 of START via the ECC bit 33 of the SCODR_BUS30-2 and also starts the performance measurement in its own device. Upon receipt of START, each CPU node 110 also starts the performance measurement (step 402).

The start of this performance measurement unit, for example, the count of the execution times of a specific instruction using a register, which is not shown in FIG. 3 and the like.

After a prescribed time, the system controller 120 is instructed to stop the performance measurement process using a dedicated debug pin, which is not shown in FIG. 3, and the like again (step 403).

Upon receipt of this instruction, the system controller 120 stops the performance measurement in its own device and also notifies all the CPU nodes 110 of STOP using the ECC bit 33 of the SCODR_BUS30-2 (step 404).

Upon receipt of this STOP, each CPU node 110 also stops the performance measurement simultaneously.

Then, each CPU node 110 reads a performance measurement result from the system controller 120 (step 405) by the same method as described above.

Thus, a plurality of CPU nodes 110 can collect performance measurement results in synchronization with the specific operating state of the system controller 120 using activation signals of START and STOP.

This performance measurement process 400 can also obtain the same effect as in the above-described history information reading process 300.

Industrial Applicability

According to the present invention, exact debug using the debug function of hardware can be realized without any cost increase.

The debug of system behaviors highly depending on an operation timing can be realized without any hardware, such as an extra dedicated signal wire and the like.

Naturally the present invention is not limited to the configurations exemplified in the above-described preferred embodiments and can be variously modified as long as its subject matter is not deviated.

Specifically, the present invention can be used to transmit not only information about debug, performance measurement and the like but also general information by intentionally operating the redundant bit of a bus.

What is claimed is:

1. A transmitter connected to a receiver through a transmission line, the receiver including a reception unit to receive data and redundant data for detecting an error of the data, a detection unit to detect an error of the received data or redundant data, and a storage control unit to write the received data in a history storage unit in an chronological order according to a first bit or a second bit contained in the redundant data in which an error is detected by the detection unit, the transmitter comprising:
   a first inverting circuit to invert the first bit when stopping writing the data received by the receiver in the history storage unit which provides history information used for debug to trace a cause of an abnormal operation or a failure;
   a second inverting circuit to invert the second bit when starting writing the data received by the receiver in the history storage unit; and
   a transmission unit to transmit the data and the redundant data including either one of the first bit inverted by the first inverting circuit or the second bit inverted by the second inverting circuit to the receiver through the transmission line.

2. The transmitter according to claim 1, further comprising:
   an inversion control unit to determine whether to perform inversion of the first bit by the first inverting circuit or inversion of the second bit by the second inverting circuit according to an input control signal.

3. The transmitter according to claim 2, wherein in the transmitter
   in cases where the inversion control unit prevents inversion of the first bit by the first inverting circuit and inversion of the second bit by the second inverting circuit, the transmission unit transmits data containing instruction information for stopping the writing to the receiver through the transmission line when stopping writing the data received by the receiver in the history storage unit, and the transmission unit transmits data containing instruction information for starting the writing to the receiver through the transmission line when starting writing the data received by the receiver in the history storage unit.

4. A transmission-reception system having a transmitter connected to a receiver through a transmission line,
the transmitter comprising:
  a first inverting circuit to invert the first bit when stopping writing the data received by the receiver in a history storage unit which provides history information used for debug to trace a cause of an abnormal operation or a failure;
  a second inverting circuit to invert the second bit when starting writing the data received by the receiver in the history storage unit; and
  a transmission unit to transmit the data and the redundant data which is for detecting an error of the data and which includes either one of the first bit inverted by the first inverting circuit or the second bit inverted by the second inverting circuit to the receiver through the transmission line, and
the receiver comprising:
  a reception unit to receive the transmitted data and redundant data through the transmission line;
  a detection unit to detect an error of the received data or redundant data; and
  a storage control unit to stop or start writing the received data in the history storage unit in an chronological order according to a first bit or a second bit contained in the redundant data in which an error is detected.

5. The transmission-reception system according to claim 4, wherein
  the transmitter further comprises an inversion control unit to determine whether or not to perform inversion of the first bit by the first inverting circuit or inversion of the second bit by the second inverting circuit according to an input control signal.

6. The transmission-reception system according to claim 5, wherein in the transmitter of the transmission-reception system,
  in cases where the inversion control unit prevents inversion of the first bit by the first inverting circuit and inversion of the second bit by the second inverting circuit, the transmission unit transmits data containing instruction information for stopping the writing to the receiver through the transmission line when stopping writing the data received by the receiver in the history storage unit, and the transmission unit transmits data containing instruction information for starting the writing to the receiver through the transmission line when starting writing the data received by the receiver in the history storage unit.

7. The transmission-reception system according to any one of claims 4 to 6, wherein in the transmitter of the transmission-reception system,
  the detection unit corrects an error of the detected data or redundant data.

8. A method for controlling a transmission-reception system which has a transmitter connected to a receiver through a transmission line, the method comprising:
  inverting a first bit by using a first inverting circuit provided for the transmitter when stopping writing the data received by the receiver in a history storage unit which provides history information used for debug to trace a cause of an abnormal operation or a failure;
  transmitting the data and the redundant data which is for detecting an error of the data and which includes the first bit inverted by the first inverting circuit to the receiver through the transmission line by using a transmission unit provided for the transmitter;
  receiving the transmitted data and the transmitted redundant data including the inverted first bit through the transmission line by using a reception unit provided for the receiver;
  detecting an error of the received data or the received redundant data including the inverted first bit by using a detection unit provided for the receiver;
  stopping writing the received data in the history storage unit in an chronological order according to the first bit contained in the redundant data in which an error is detected by using a history control unit provided for the receiver;
  inverting a second bit by using a second inverting circuit provided for the transmitter when starting writing the data received by the receiver in the history storage unit;
  transmitting the data and the redundant data which is for detecting an error of the data and which includes the second bit inverted by the second inverting circuit to the receiver through the transmission line by using the transmission unit provided for the transmitter;
  receiving the transmitted data and the transmitted redundant data including the inverted second bit through the transmission line by using the reception unit provided for the receiver;
  detecting an error of the received data or the received redundant data including the inverted second bit by using the detection unit provided for the receiver; and
  starting writing the received data in the history storage unit in an chronological order according to the second bit contained in the redundant data in which an error is detected by using the history control unit provided for the receiver.

* * * * *